United States Patent [19]

Percec

[11] Patent Number: 5,241,044
[45] Date of Patent: Aug. 31, 1993

[54] SOLUBLE POLY(P-PHENYLENE)S

[75] Inventor: Virgil Percec, Pepper Pike, Ohio

[73] Assignee: Edison Polymer Innovation Corporation, Brecksville, Ohio

[21] Appl. No.: 854,233

[22] Filed: Mar. 20, 1992

[51] Int. Cl.$^5$ .............................................. C08G 61/10
[52] U.S. Cl. ................................. 528/391; 525/416; 525/535; 528/374; 528/396; 558/54
[58] Field of Search ........................ 528/391, 396, 374

[56] References Cited

PUBLICATIONS

Stille, *Macromolecules*, 1971, 4,515.
Mukamal, et al., *J. Polym. Sci., Part A*, 1967, 5,2721.
Stille, et al., *Macromolecules*, 1968, 1,431.
Rehahn, et al. *Polymer*, 1989, 30,1054.
Noll, et al., *Makromol. Chem. Rapid Commun.*, 1990, 11,485.
Rehahn, et al., *Polymer*, 1989, 30,1060.
Rehahn, et al. *Makromol. Chem.*, 1990, 191,1991.
Tour, et al., *J. Am. Chem. Soc.*, 1991, 113,2309.
Hergenrother, *J. Macromol. Sci.-Rev. Macromol. Chem.*, 1980 C19 1.
Kim, et al., *J. Am. Chem. Soc.*, 1990, 112,4592.

*Primary Examiner*—Harold D. Anderson
*Attorney, Agent, or Firm*—Louis J. Weisz

[57] ABSTRACT

A process for preparing poly(p-phenylene)s comprises reacting dihydroxy aromatic compounds such as orthoquinone and bisphenols with halogen-substituted aliphatic sulfonic acids, halogen sulfonic acid, or their anhydrides. The monomers thus formed are subsequently polymerized with Ni(0) catalysts to yield the desired polymers. The monomers or polymers may be functionalized with reactive groups.

7 Claims, No Drawings

SOLUBLE POLY(P-PHENYLENE)S

TECHNICAL FIELD

This invention relates to novel processes for synthesizing polyphenylenes, and to the soluble products resulting from such processes. More particularly, this invention relates to poly(p-phenylene) compounds that are soluble in a variety of organic solvents, and that can be readily synthesized from commercially available materials. Specifically, this invention relates to the synthesis of poly(p-phenylene)s carried by polymerizing the bis(trihalogenaliphaticsulfonyloxy) salts of certain dihydroxy aromatic compounds in the presence of catalysts containing nickel in its zero oxidative state.

BACKGROUND OF THE INVENTION

Polyphenylenes are among the simplest aromatic polymers that it is possible to prepare, and in fact, they may be thought of as the aromatic homologues of polyethylene. While such polymers are commonly characterized by superior thermal stability, due to their aromaticity, unfortunately they tend to be highly crystalline in nature, and therefore, insoluble in most organic solvents. Such insolubility substantially interferes with the ability to chemically modify the polymers, and to employ them in carrying out further, desirable reactions. Furthermore, the use of insoluble polymers is constrained, for example, in that they cannot be used to form cast films from solution, or be employed as monomeric oligomers in preparing still other valuable polymers.

In view of their advantageous characteristics, it has long been an objective of polymer chemists to develop a polyphenylene synthesis leading to soluble polyphenylene products. In the past, such attempts have included efforts to enhance the solubility of such products by the attachment of lateral substitutents, Kern et al., *Makromol. Chem.*, 1960, 37, 198. In addition, soluble high molecular weight phenylated poly (p-phenylene)s have been synthesized by the Diels-Alder reaction of bistetracyclones with p- or m-diethynylbenzene, Stille, *Macromolecules*, 1971, 4, 515; Mukamal et al. *J. Polym. Sci., Part A*, 1967, 5, 2721; and Stille et al., *Macromolecules*, 1968, 1, 431.

Additional classes of soluble poly(p-phenylene)s have been obtained through the polymerization of 2,5-dibromo-1,4-di-n-alkylbenzenes, Rehahn et al., *Polymer*, 1989, 30, 1054, and by the polymerization of 2,5 dibromophenyl, Noll et al., *Makromol. Chem., Rapid Commun.*, 1990, 11, 485, both the preceding using the Yamamoto reaction, i.e., Pd(0) catalyzed polymerization of 4-bromo-2,5-di-n-hexylbenzeneboronic acid, Rehahn et al., *Polymer*, 1989, 30, 1060, and Rehahn et al., *Makromol. Chem.*, 1990, 191, 1991; by the anionic polymerization of 2-phenyl-1,3 cylohexadiene followed by aromatization, Noll et al., ibid; and by spontaneous polymerization of 1-bromo-4-lithiobenzene in hexamethylphosphoramide, Tour et al., *J. Am. Chem. Soc.*, 1991, 113, 2309. The polymer resulting from the 1-bromo-4-lithobenzene is soluble because it contains both para and meta linkages, Tour et al., ibid.

Highly branched polyphenylenes can be synthesized by cocyclotrimerization of p-diethynylbenzene with phenylacetylene, Hergenrother, *J. Macromol. Sci.-Rev. Macromol. Chem.*, 1980, C19, 1, and by Pd(0) catalyzed homocoupling of (3,5-dibromophenyl) boronic acid, such polymer also being soluble, Kim et al., *J. Am. Chem. Soc.*, 1990, 112, 4592.

Furthermore, soluble polyarylenes containing binaphthylene structural units have been synthesized by cation-radical polymerization of bis(1-naphthyl) biphenyls, Percec et al., *J. Polym. Sci., Part A; Polym. Chem. Ed.*, in press. The bulky and twisted binaphthylene structural units are believed most likely responsible for the solubility of the resulting polymers.

While soluble polyphenylenes have previously been prepared by a number of processes, including those described in the preceding, such processes have typically been relatively complex, in many cases requiring excessive processing steps. Furthermore, the starting materials have in numerous instances not been commercially available. These and other factors have, consequently, limited the usefulness of the procedures previously known.

BRIEF DESCRIPTION OF THE INVENTION

In view of the preceding, therefore, it is a first aspect of this invention to prepare polymers exhibiting improved heat stability.

A second aspect of this invention is to provide poly(p-phenylene) polymers that can be solubilized in organic solvents.

Another aspect of this invention is to provide solvent-soluble polyphenylene polymers from commercially available materials.

Yet another aspect of this invention is to provide a process for preparing polyphenylene polymers that permits their synthesis with minimal steps.

An additional aspect of this invention is to provide a process for preparing solvent-soluble poly(p-phenylene) polymers.

A further aspect of this invention is to provide soluble polyphenylenes with reactive groups attached thereto, that can function as reactive oligomers in subsequent polymerizations.

Still an additional aspect of this invention is to provide poly(p-phenylene) polymers characterized by having reduced crystallinity.

The foregoing and other aspects of the invention are provided by a process for preparing polyphenylenes soluble in organic solvents comprising reacting dihydroxy aromatic compounds with members of the group consisting of halogen-substituted sulfonic acid, and the anhydrides thereof, to form halogen substituted bis(sulfonyloxy) aromatic monomers, and thereafter polymerizing the monomers in the presence of Ni(0) catalysts to form the polyphenylenes.

The preceding and other aspects of the invention are provided by a process for preparing poly(p-phenylene)s soluble in dipolar, aprotic organic solvents comprising reacting members of the group consisting of substituted hydroquinones, and mixtures of different bisphenols, with members of the group consisting of trifluorosubstituted aliphaticsulfonic acids, and the anhydrides thereof, to form bis(trifluoroaliphaticsulfonyloxy) aromatic monomers, and thereafter polymerizing the monomers in the presence of Ni(0) catalysts to form the poly(p-phenylene)s, both the monomer synthesis reaction and the monomer polymerization being carried out in such solvents.

The foregoing and additional aspects of the invention are provided by bis(trifluoromethanesulfonyloxy) esters of substituted hydroquinones.

The foregoing and further aspects of the invention are provided by bis(trifluoromethanesulfonyloxy) esters of bisphenols.

The foregoing and still other aspects of the invention are provided by polymers formed with bis(trifluoromethanesulfonyloxy) esters of substituted hydroquinones.

The foregoing and yet other aspects of the invention are provided by polymers formed from mixtures of different bis(trifluoromethanesulfonyloxy) bisphenol esters.

DETAILED DESCRIPTION OF THE INVENTION

The process for synthesizing the soluble polyphenylenes of the invention is desirably carried out in two steps. The first involves the formation of bis(sulfonyloxy) derivatives of substituted di-hydroxy aromatic compounds. The second involves a homocoupling reaction of such derivatives carried out in the presence of a nickel catalyst in which the nickel is present in a zero oxidative state, i.e., Ni(0).

The first step involves the reaction of a dihydroxy aromatic compound with a halogenated sulfonic acid, or its anhydride, to produce a monomeric ester. Where the dihydroxy aromatic compound is a substituted hydroquinone, for example, phenol hydroquinone, its reaction with for instance trifluoromethanesulfonic anhydride, "triflic anhydride", yields the "triflate" 2,5-bis(-trifluoromethanesulfonyloxy) biphenyl. The sequence is illustrated in the following reaction.

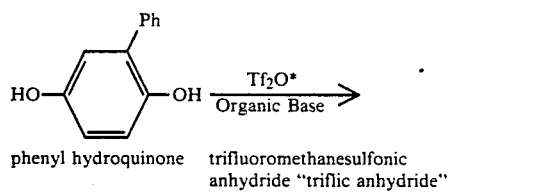

phenyl hydroquinone    trifluoromethanesulfonic anhydride "triflic anhydride"

*Tf = (SO$_2$CF$_3$)

In a second step, the reactive monomeric triflate then can be polymerized in the presence of a nickel catalyst in which the metal is in the zero oxidative state to produce the poly(2,5-bis(trifluoromethanesulfonyloxy) biphenyl containing triflate chain ends. The reaction proceeds as follows.

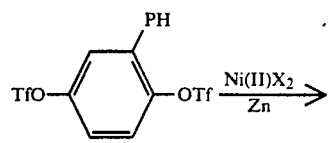

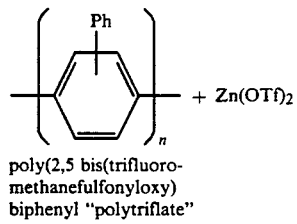

poly(2,5 bis(trifluoromethanefulfonyloxy) biphenyl "polytriflate"

While not intending to be bound by the theory, it is believed that the resulting polymer is soluble in certain organic solvents as the probable consequence of the large number of constitutional isomeric structural units present in the polymer chains. This increases the configurational entropy and decreases the polymers crystallization ability. In the case of the triflate 2,5-bis(trifluoromethanesulfonyloxy) biphenyl, the triflate produces three possible isomers, as is shown in the following.

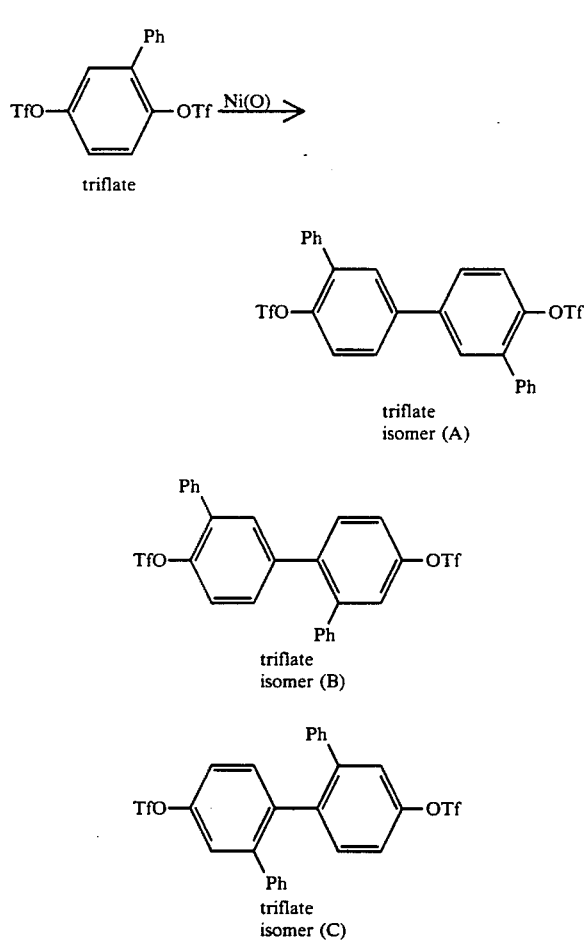

The polymerization of the three isomers results in an asymmetrical configuration, for example, as illustrated below.

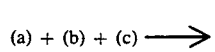

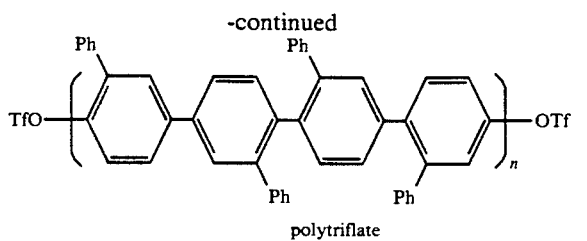

polytriflate

In the case of hydroquinone, the presence of a substitutent in the aromatic ring leads to the statistical randomness thought to be responsible for the solubility described.

With respect to the bisphenol compounds, i.e., compounds having the formula

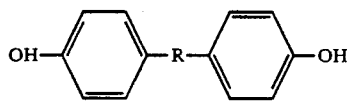

where "R" may be ether, aliphatic, or any of a variety of other linkages, asymmetry can be achieved, for example, by carrying out the polymerization of a mixture containing more than one bisphenol triflate compound, that is, where the "R" in such compounds is different. In the polymerization reaction, therefore, the different bisphenol triflates are polymerized in a statistically random configuration, which results in the required asymmetry.

While the following list is not intended to be all-inclusive, monomers may comprise compounds including bis(trifluoroaliphaticsulfonyloxy) and bis(fluorosulfonyloxy) aromatic monomers such as 2,5 bis(trifluoromethanesulfonyloxy)biphenyl; 2,5 bis(trifluoromethanesulfonyloxy)benzoate;2-tert-butyl-1,4bis(trifluoromethanesulfonyloxy) benzene, other bistriflates of hydroquinone compounds, as well as bistriflates of bisphenol compounds.

A variety of dihydroxy aromatic compounds can be employed for purposes of the invention, for example, substituted hydroquinones, and any of various phenols. In the case of the hydroquinones, the aromatic ring may be singly substituted, or it may have multiple substitutents. Such substitutents can include esters, amides, imides, nitriles and other groups. For example, phenyl hydroquinone, tert-butyl-hydroquinone, methyl 2,5-dihydroxybenzoate, as well as additional hydroquinones are all suitable.

In the case of bisphenols, various bisphenols compounds including bisphenol A; 4,4′dihydroxy-1,1′binapthyl; 4,4′-dihydroxybiphenyl, and others are all suitable. As has been pointed out in connection with the preceding discussion, and referring to the structural bisphenol formula shown, a mixture of bisphenols in which "R" is different will provide the desired statistical asymmetry.

With respect to the sulfonic acid reactant, various halogen-substituted sulfonic acids, and their anhydrides may all be used in synthesizing the monomers of the invention. In preferred embodiments of the invention, however, aliphatic sulfonic acids and their anhydrides are employed, especially the trihalogen-substituted acids and anhydrides. In one preferred embodiment, the sulfonic compounds will be those of the aliphatic type, for example, methyl or halogen-methyl substituted compounds. Halogensulfonic acid may also be employed. A particularly preferred embodiment of the invention will employ trifluoromethanesulfonic acid, fluorosulfonic acid or their anhydrides. While the monomeric reaction will typically be carried out at room temperature, the reaction mixture may be heated if desired.

While other solvents such as, for example, tetrahydrofuran may be used, both the monomer synthesis and the polymerization are advantageously carried out in a dipolar, aprotic solvent such as for example dimethyl formamide, methyl pyrrolidone, and others. The polymerization reactions are ordinarily conducted at from room temperature up to a temperature of 100° C., although higher temperatures may be employed if desired.

The polymerization is conducted in the presence of a nickel catalyst in its zero oxidative state. Any of various catalyst systems are suitable, the principal components comprising a soluble nickel compound, triphenylphosphine and a reducing agent such as zinc or magnesium. The ratio of nickel to triphenylphosphine will ordinarily be from about 1/1 to about 1/100, and enough reducing agent will be present to assure that the nickel present will be in its zero oxidative state.

A typical catalyst system, for example will involve $NiCl_2$, $Ph_3P$ and Zn in a polar solvent such a dimethylformamide, or dimethylacetamide. 2,2′-dipyridyl may be added to suppress any phenylation caused by the reaction between the Ni(O) species and the $Ph_3P$. The Ni(O) catalyst may also be prepared from $Ni(Ph_3P)_2Cl_2$ in the presence of Zn and tetraethylammonium iodide, $Et_4Ni$, in a less polar solvent, such as tetrahydrofuran. Although the function of $Et_4Ni$ has not been entirely clarified, it is believed that it can play the role of a bridging agent between Ni and Zn, which facilitates the reduction of Ni(II) to Ni(O).

The amount of catalyst may be varied rather widely; however, in ordinary circumstances, the amount of catalyst used will be from about 3 to about 14 mol %, based on the moles of monomer present. Some evidence tends to suggest that increased amounts of catalyst and higher temperatures serve to increase the amount of the yield obtainable.

The polymers of the invention exhibit stability up to 600° C. and are useful in applications requiring resistance to high temperature environments. By functionalizing polymeric oligomers prepared by the process of the invention, the oligomers can be further reacted with other monomers to provide still different polymers having useful properties. While the monomers themselves can be functionalized, for example, by hydrolyzing ester substitutents forming a part thereof, the polymers can also be treated following their formation to provide reactive groups including, for instance, imides, amides, nitriles and the like.

Polymers of the invention include, but are not limited to, polytriflates of hydroquinone including poly(p-biphenylene); poly(p-phenylenemethylbenzoate); poly (tertiary-butyl-phenylene). Polymers of the invention also include polytriflates of bisphenols, including polytriflates of bisphenol A, and others.

While not intended to be limiting in nature, the invention is illustrated by the following Examples.

EXAMPLE 1

Preparation of methyl 2,5 bis(trifluoromethanesulfonyloxy) benzoate

Methyl 2,5-dihydroxybenzoic acid (Aldrich 99%) is esterified with methanol and purified by column chromatography on silica gel, using a mixture of toluene and hexanes. The resulting methyl 2,5-dihydroxybenzoate (purity 99.5%), 2.240 gms., 13.32 mmo., is dissolved in dried pyridene, 50 mL at 0° C. under $N_2$. To this solution trifluoromethanesulfonic anhydride, 6.0 mL, 10.06 gms, 35.66 mmols, is added dropwise. The resulting red solution is stirred at 0° C. for ten minutes and allowed to warm to room temperature. Stirring is continued for about forty hours at room temperature, and the reaction mixture is then poured into water. The mixture is extracted three times with diethylether, and the extract subsequently washed once with water, twice with 10% hydrochloric acid, again with water, and twice with saturated sodium chloride solution. The extract is dried over anhydrous $MgSO_4$, and the solvent is removed on a rotary evaporator. The crude, oily product is purified by silica gel chromatography, using hexanes as the eluent, a colorless oil being thereby obtained. The yield is 4.69 gms. (81.5%), and the purity as measured by a high performance liquid chromatography is 96.3%.

EXAMPLE 2

Preparation of 2,5-bis(trifluoromethanesulfonyloxy)biphenyl 2,5-bis(trifluoromethanesulfonyloxy)biphenyl is synthesized from phenyolhydroquinone (Aldrich, 97%), purified by recrystallization from a mixture of hexanes and tolulenes (volume ratio=2/1), by the same procedure described in EXAMPLE 1. The crude product is purified by silica gel column chromatography using a mixture of hexanes and benzene (volume ratio=5/1) to yield a colorless oil. The yield is 92.4%, while the purity is determined to be in excess of 99.9%.

EXAMPLE 3

Preparation of 2,tert-butyl-1,4-bis-trifluoromethanesulfonyloxy)benzene 2-tert-butyl-1,4-bis(trifluoromethanesulfonyloxy)benzene is synthesized from tert-butyl hydroquinone (Aldrich, 97%), purified by being recrystallized twice from toluene using the same procedure as that described for the synthesis of EXAMPLES 1 and 2 above. The crude product is purified by silica gel column chromatography using hexanes as the eluent to yield a colorless oil. The yield is 83.0%, and the purity exceeds 99.9%.

EXAMPLE 4

Preparation of 4,4'-isopropylidene bis(phenyltrifluoromethanesulfonate)

4,4'-isopropylidene bis(phenyltrifluoromethanesulfonate) is synthesized from bisphenol A using the same method described in connection with EXAMPLE 1. The yield is 69.4% of pale yellow crystals exhibiting a melting point of 58°-60° C.

EXAMPLE 5

Preparation of 1,1'-binapthyl-4,4'-bis(trifluoromethanesulfonate)

4,4'dihydroxy-1,1'bisnapthyl is used to prepare 1,1'-binapthyl-4,4'-bis(trifluoromethanesulfonate) according to the procedure of EXAMPLE 1. The product is formed as yellow crystals at a yield of 51.7%. The product has a purity of 99.9%, and displays a melting point of about 104°-106° C.

EXAMPLE 6

Polymerization of 2,5-bis(trifluoromethanesulfonyloxy)biphenyl $Ni(Ph_3P)_2Cl_2$, 0.215 gms, 0.33 mmols, together with Zn powder, 1.688 gms, 25.82 mmols, and $Et_4Ni$, 0.791 gms., 3.07 mmols, are placed in a 15 mL round bottomed flask equipped with a condenser and a stop-cock. The flask is evacuated under vacuum for six hours and then filled with nitrogen. Thereafter, evacuation and filling with nitrogen is repeated four times. 1.0 mL of freshly distilled tetrahydrofuran is added with a syringe through the rubber septum on the top of the condenser. The mixture is stirred at room temperature for five minutes, during which time the color of the mixture gradually assumes a deep red brown. 2,5-bis(trifluoromethanesulfonyloxy)biphenyl prepared as described in EXAMPLE 2, 1.177 gms., 2.616 mmols, is dissolved in 0.5 mL of freshly distilled tetrahydrofuran and added to the catalyst mixture by means of a syringe through the rubber septum. The reaction mixture is then heated to its reflux temperature and stirred for approximately one hour. The reaction mixture is subsequently cooled to room temperature and poured into 100 mL of methanol, acidified with hydrochloric acid. The precipitate containing Zn powder is collected by filtration and dissolved in 10 mL of $CHCl_3$. The solution is subsequently filtered to remove Zn powder, after which the filtrate is concentrated and poured into methanol acidified with HCl. The precipitate is thereafter collected by filtration and vacuum dried. The yield is 0.194 gms (48.8%). Finally, the polymer is purified by washing the $CHCl_3$ solution with water and reprecipitated in methanol prior to analysis by gel permeation chromatography. The number average molecular weight, Mn, is found to be 2000 gm/mol. While the ratio of Mw (weight average molecular weight) /Mn=1.4.

Polymerizations of 2,5bis(trifluoromethanesulfonyloxy)benzoate; 2,-tert-butyl-1,4-bis(trifluoromethanesulfonyloxy)benzene; bisphenol A, and 4,4'dihydroxy-1,1'-bisnapthyl are performed in the manner described in connection with EXAMPLE 6.

While in accordance with the patent statutes, a preferred embodiment and best mode has been presented, the scope of the invention is not limited thereto, but rather is measured by the scope of the attached claims.

What is claimed is:

1. A process for preparing a polyphenylene soluble in organic solvents comprising reacting a dihydroxy aromatic compound with a member of the group consisting of a halogen-substituted sulfonic acid, and the anhydride thereof, to form a bis(trifluoromethane sulfonyl oxy)ester of diphenol, and thereafter polymerizing the ester in the presence of a zero valence Ni catalyst to form said polyphenylene.

2. A process according to claim 1 wherein said polyphenylene is poly(p-phenylene), said dihydroxy aromatic compound is selected from the group consisting of a substituted hydroquinone, and a mixture of bisphenols, and said acid is a perfluorinated, aliphatic sulfonic acid.

3. A process according to claim 2 wherein said acid is selected from the group consisting of trifluromethanesulfonic acid, and fluorosulfonic acid, comprising synthesizing and polymerizing the ester in a dipolar, aprotic solvent.

4. A process according to claim 3 wherein said dihydroxy aromatic compound is a substituted hydroquinone.

5. A process according to claim 4 wherein the substituted substitutent is selected from a member of the group consisting of an ester group, a phenyl group and a tertiary butyl group.

6. A process for preparing a poly(p-phenylene) soluble in a dipolar, aprotic organic solvent comprising reacting in the presence of said solvent a member of the group consisting of a substituted hydroquinone, and a mixture of different bisphenols, with a member of the group consisting of a trifluoro-substituted aliphatic sulfonic acid, fluorosulfonic acid, and the anhydrides thereof, to form a member selected from the group consisting of bis(trifluoroaliphaticsulfonyloxy) aromatic monomer, and bis(fluorosulfonyloxy) aromatic monomer and thereafter polymerizing said monomer in said solvent in the presence of a zero valence Ni catalyst to form said poly(p-phenylene).

7. A process according to claim 1 wherein said acid is selected from the group consisting of trifluoromethanesulfonic acid and fluorosulfonic acid, and the monomer is formed from said substituted hydroquinone.

* * * * *